(12) United States Patent
Pereira

(10) Patent No.: US 8,718,842 B2
(45) Date of Patent: May 6, 2014

(54) HYDROPLANING VESSEL WITH REACTIVE SUSPENSION AND INTEGRATED BRAKING, STEERING SYSTEM

(76) Inventor: Fred Pereira, Las Vegas, NV (US)

( * ) Notice: Subject to any disclaimer, the term of this patent is extended or adjusted under 35 U.S.C. 154(b) by 171 days.

(21) Appl. No.: 13/247,806

(22) Filed: Sep. 28, 2011

(65) Prior Publication Data

US 2012/0017820 A1    Jan. 26, 2012

Related U.S. Application Data

(63) Continuation-in-part of application No. 12/592,904, filed on Dec. 3, 2009.

(60) Provisional application No. 61/200,682, filed on Dec. 3, 2008.

(51) Int. Cl.
| B60L 3/00 | (2006.01) |
| B60L 15/00 | (2006.01) |
| G05D 1/00 | (2006.01) |
| G05D 3/00 | (2006.01) |
| G06F 7/00 | (2006.01) |
| G06F 17/00 | (2006.01) |

(52) U.S. Cl.
USPC .............. 701/21; 701/36; 701/37; 114/271; 114/279; 114/284

(58) Field of Classification Search
USPC ........... 701/21, 36, 37; 114/55.5, 55.54, 271, 114/279, 284
See application file for complete search history.

(56) References Cited

U.S. PATENT DOCUMENTS

| 3,257,982 | A | * | 6/1966 | Meldrum | 114/315 |
| 3,517,632 | A | * | 6/1970 | Gray | 114/283 |
| 4,351,262 | A | * | 9/1982 | Matthews | 114/284 |
| 4,649,851 | A | * | 3/1987 | April | 114/271 |
| 5,277,142 | A | * | 1/1994 | Connor | 114/61.16 |
| 5,520,133 | A | * | 5/1996 | Wiegert | 114/125 |
| 5,603,281 | A | * | 2/1997 | Harvey et al. | 114/363 |
| 5,697,317 | A | * | 12/1997 | Pereira | 114/55.52 |
| 6,620,003 | B2 | * | 9/2003 | Mardikian | 440/38 |
| 6,763,774 | B1 | * | 7/2004 | Ranieri et al. | 114/76 |
| 6,892,666 | B1 | * | 5/2005 | Plante et al. | 114/363 |
| 7,874,882 | B2 | * | 1/2011 | Sagov | 440/14 |
| 7,913,636 | B2 | * | 3/2011 | Meyer | 114/283 |
| 7,946,237 | B2 | * | 5/2011 | Fong et al. | 114/144 R |
| 2007/0139216 | A1 | * | 6/2007 | Breed | 340/825.72 |
| 2007/0261625 | A1 | * | 11/2007 | Hodge | 114/123 |
| 2008/0216728 | A1 | * | 9/2008 | Hofbauer | 114/39.25 |

* cited by examiner

*Primary Examiner* — Rami Khatib
(74) *Attorney, Agent, or Firm* — Mark S. Hubert

(57) ABSTRACT

A hydroplaning vessel with several stability and handling design improvements. It has an enhanced reactive suspension and inner hull lift system positioned in the vessel between a set of separating inner and outer hulls. The outer hull does not float on its own as it has numerous fixed louvers formed there through and also has an open transom. Steering and braking are accomplished by a set of rear elevon flaps affixed to the outer hull. The drive unit resides in the inner hull and is connected by an annular drive transmission which is connected to the jet or prop drive which resides on the outer hull.

10 Claims, 22 Drawing Sheets

HYDROPLANING VESSEL WITH REACTIVE SUSPENSION AND INTEGRATED BRAKING, STEERING SYSTEM

Applicant claims priority to U.S. Utility patent application Ser. No. 12/592,904 Entitled "REACTIVE SUSPENSION WITH AN INTEGRATED BRAKING AND STEERING SYSTEM FOR A BOAT" filed Dec. 3, 2009 which claims priority of U.S. Provisional Patent Application Ser. No. 61/200,682 entitled "Watercraft Stabilization System", filed Dec. 3, 2008, and incorporates by reference all material therein.

BACKGROUND OF THE INVENTION

The present invention relates to an improved suspension system integrated with a steering and braking system adapted to ensure that a smooth ride is experienced in the passenger compartment of a dual hull boat. More particularly, to a suspension system for a hydroplaning vessel designed to provide, stability, comfort as well as enhanced handling and safety.

Heretofore, because of the inherent jostling of a water vessel motorized watersports such as boating have been for those who are not prone to motion sickness or have back disorders. Further, the cost of fueling and operating a water vessel has become prohibitive for many. This new invention utilizes and combines known and new technologies in a unique and novel configuration to overcome the high energy requirements of operating a water vessel and to reduce the aforementioned "jostling" problems.

SUMMARY OF THE INVENTION

The general'purpose of the present invention, which will be described subsequently in greater detail, is to provide a dual hull boat with an enhanced suspension system that is able to stabilize the passenger compartment or seating area with respect to the motion of the outer hull, separate and raise the inner hull from the outer hull, optimize the handling response of the vessel and provide a level of comfort and minimized motion heretofore unknown in the water sport industry. This suspension system has many of the advantages mentioned heretofore and many novel features that result in a new boat suspension system which is not anticipated, rendered obvious, suggested, or even implied by any of the prior art, either alone or in any combination thereof.

An object of the present invention is to provide an improved dual hull water vessel capable of minimized drag and maximized fuel conservation.

It is another object of this invention to provide an improved steering and braking system for a boat capable of meeting or exceeding all known standards for boat handling.

It is another object of this invention to provide a suspension system that connects and resides between the outer and inner vessel hulls and is capable of dramatically reducing the G. forces generated when the outer hall impact the oncoming waves.

It is a further object of this invention to provide a boat adapted for use by persons prone to discomfort or injury as a result of excessive G forces upon their bodies.

It is yet a further object of this invention to provide a low drag, energy efficient water vehicle capable of enhanced handling, braking and suspension characteristics.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DETAILED DESCRIPTION

Figure 1:
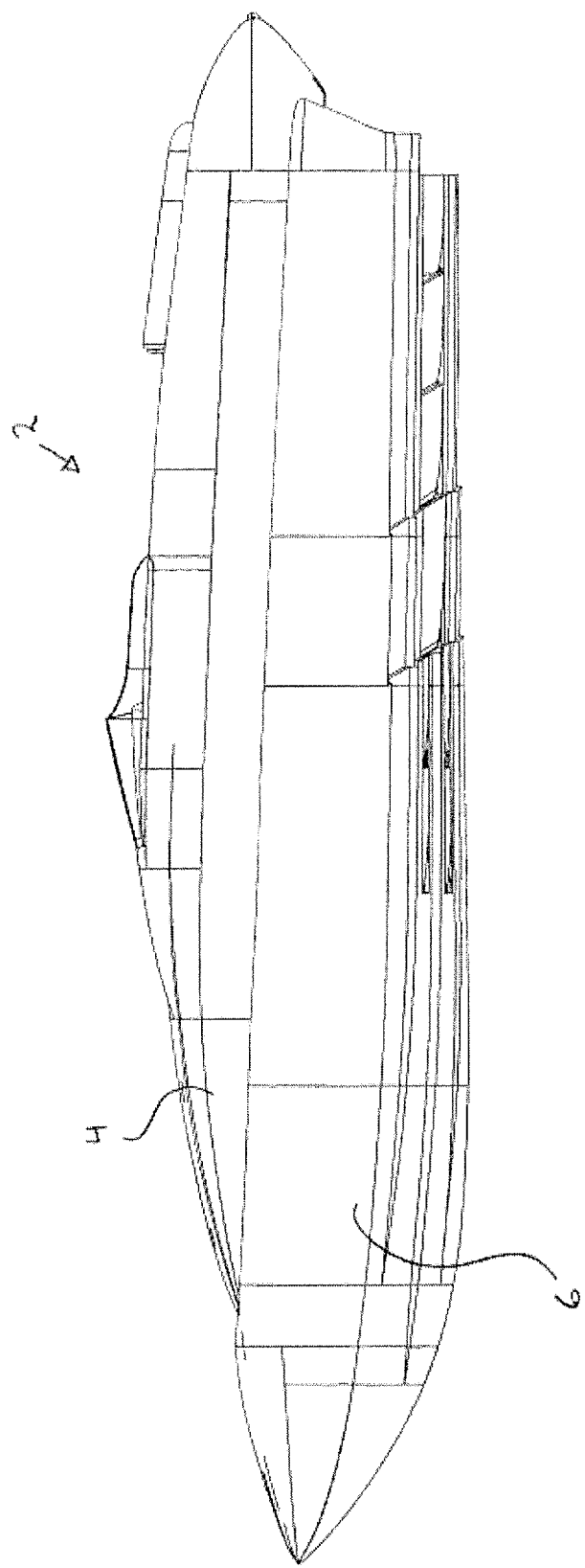
FIG. 1 is a side view of the vessel with the propulsion and steering systems removed for clarity.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

The present invention entails a dual hull boat adapted for hydroplane operation that has a suspension system integrated with a inner hull lift system. It also incorporates a novel propulsion and drive system as well as a steering and braking system. These three systems cooperate to present a water vehicle that is energy efficient, uses less power, has outstanding handling and braking characteristics and that offers a suspension system for a smooth ride.

Figure 11:
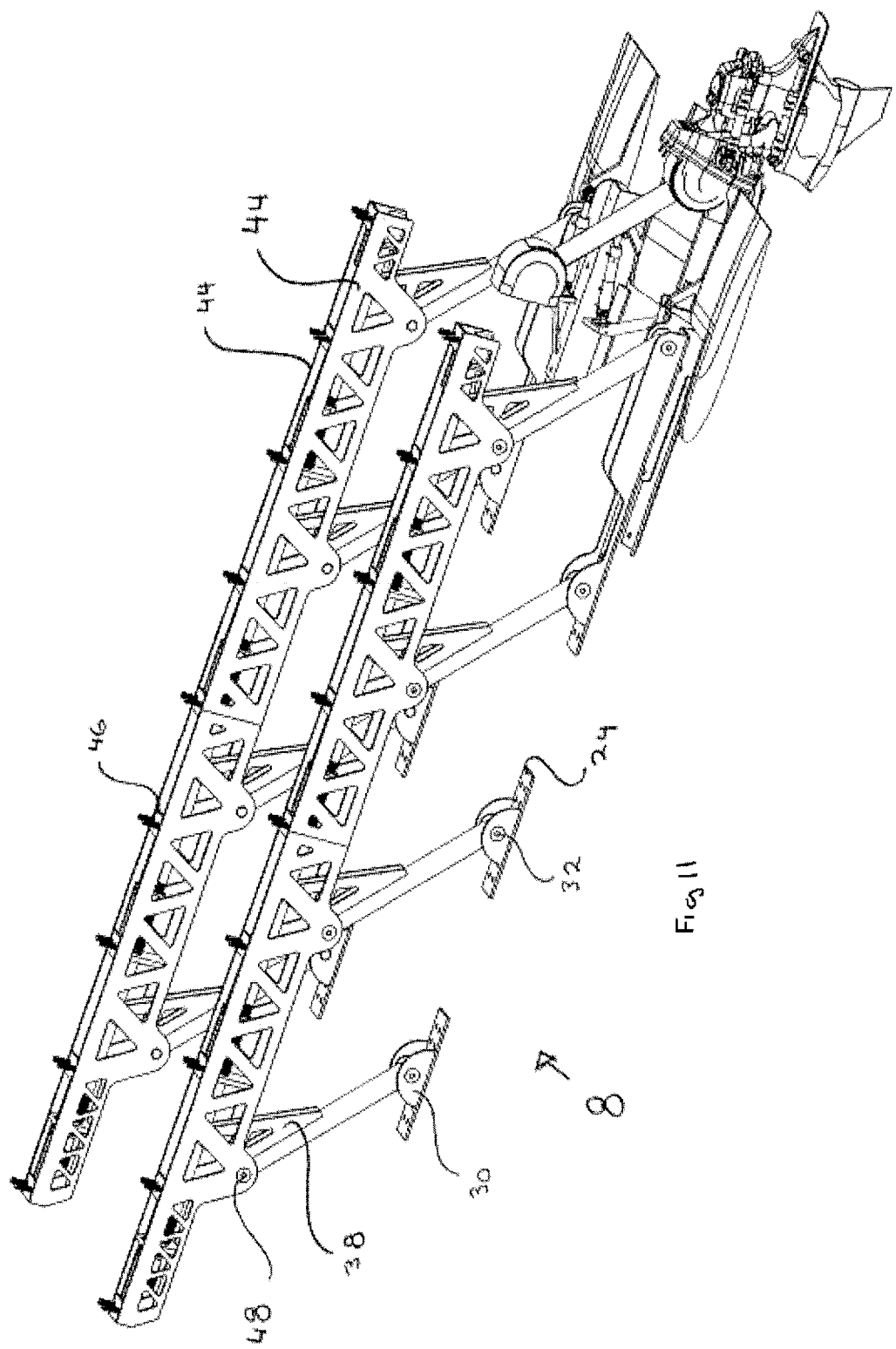
FIG. 11 is a side perspective view of the vessel's suspension, steering and propulsion systems.
Figure 12:
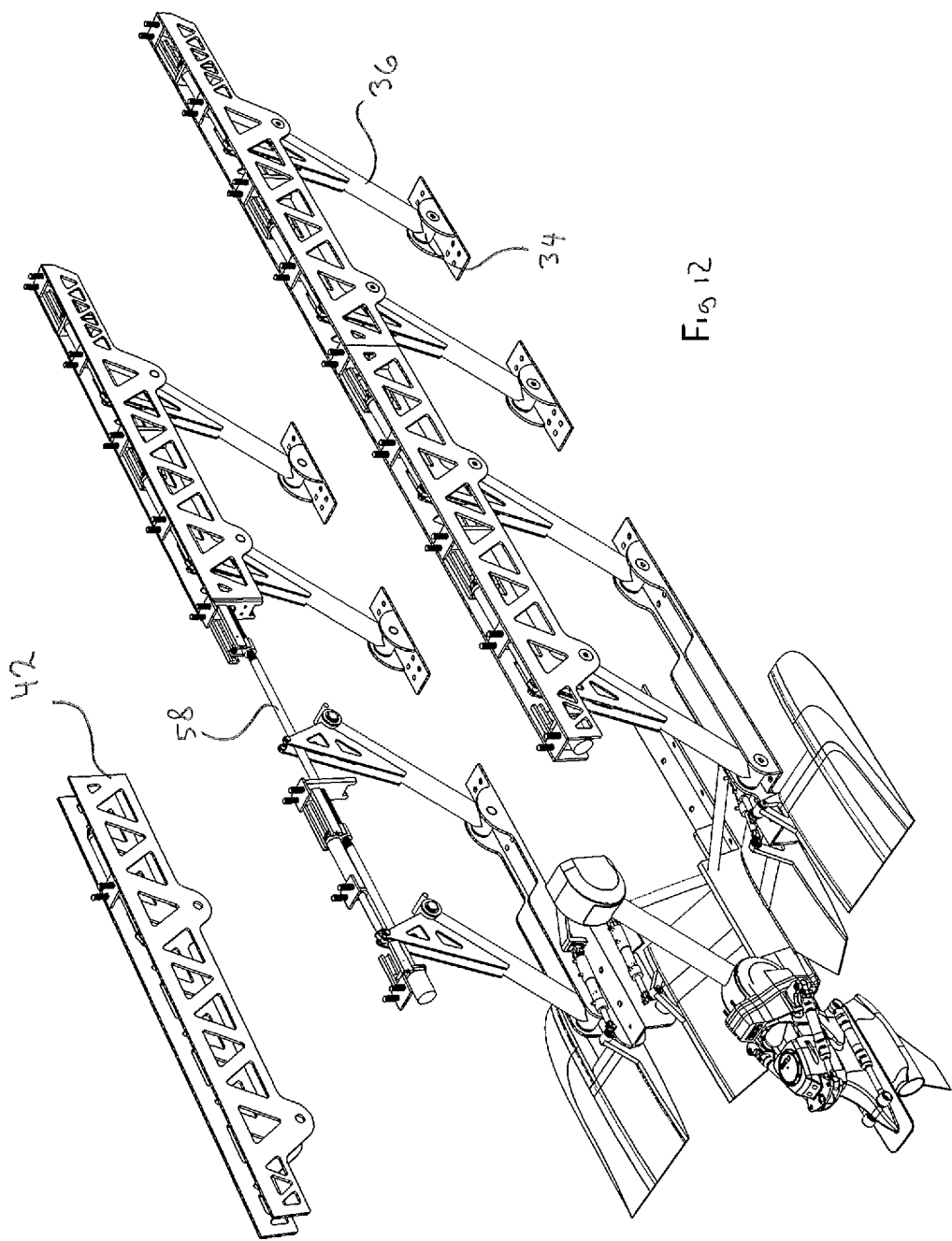
FIG. 12 is a top perspective view of the vessels suspension, steering and propulsion system with one of the inner hull support mount plates removed.
Figure 13:
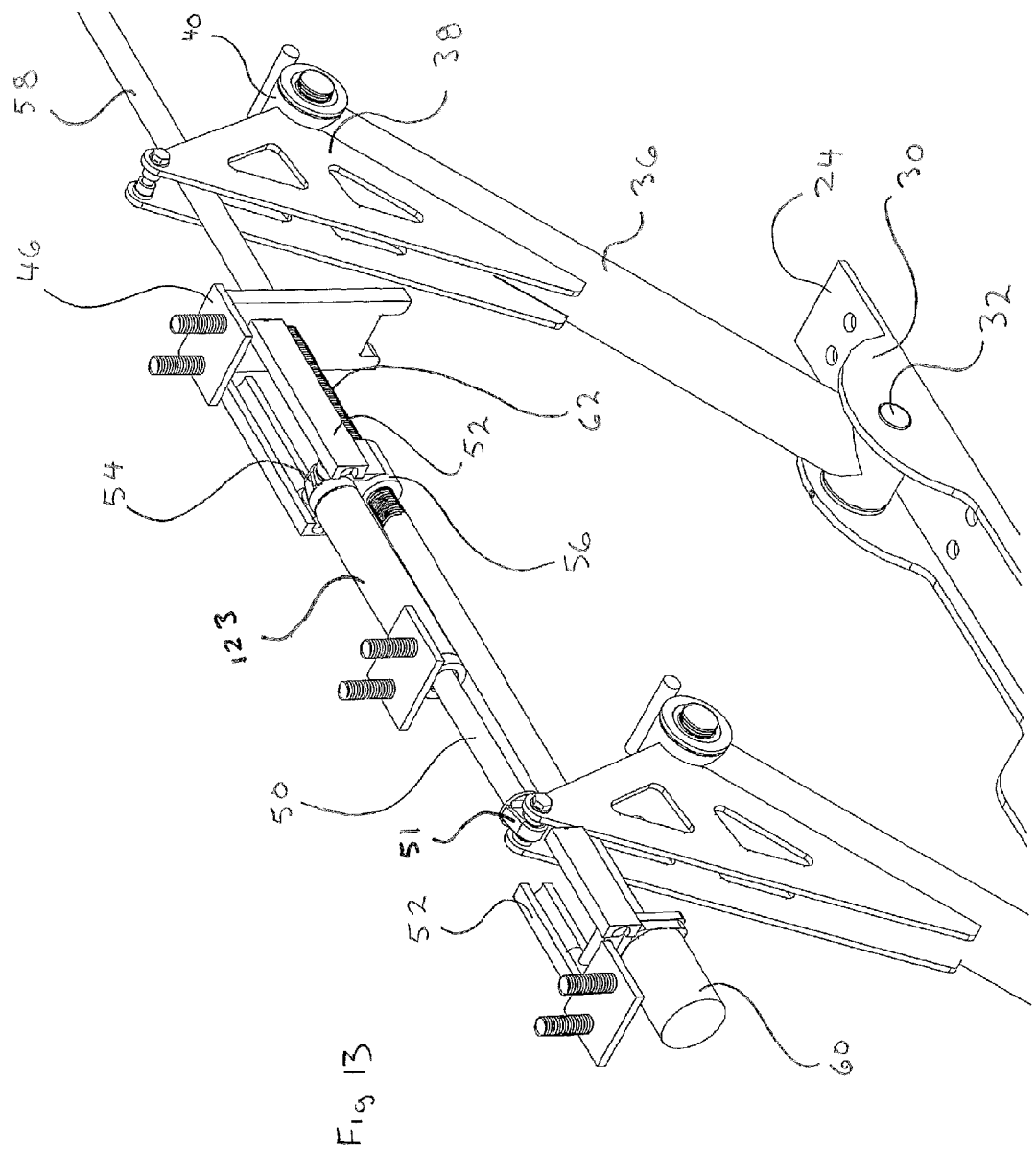
FIG. 13 is a top perspective view of the component arrangement of the suspension system.

Looking at FIGS. 1 to 6 the dual hull design of the vessel 2 can best be seen. The vessel 2 has an inner hull 4 that is partially cradled in a larger, outer hull 6. The outer hull 6 has no stern or transom plate, and cannot float on its own. This design is distinguishable from a cradled lower hull and upper hull design in that the outer hull cannot float on its own accord since it is open at the rear and has numerous open louvers on its bottom surface. Although it is referred to as the lower hull 6, technically it is not a "vessel hull" because it is not capable of floating. The vessel 2 is supported when not moving, by the buoyancy of the inner hull 4. Between these two hulls there is an operative space 10 wherein resides a suspension system 8 (see FIG. 11) that serves the dual functions of raising or lowering the inner hull so as to separate the two hulls, and to act as a shock absorption system between these two hulls.

Figure 7:
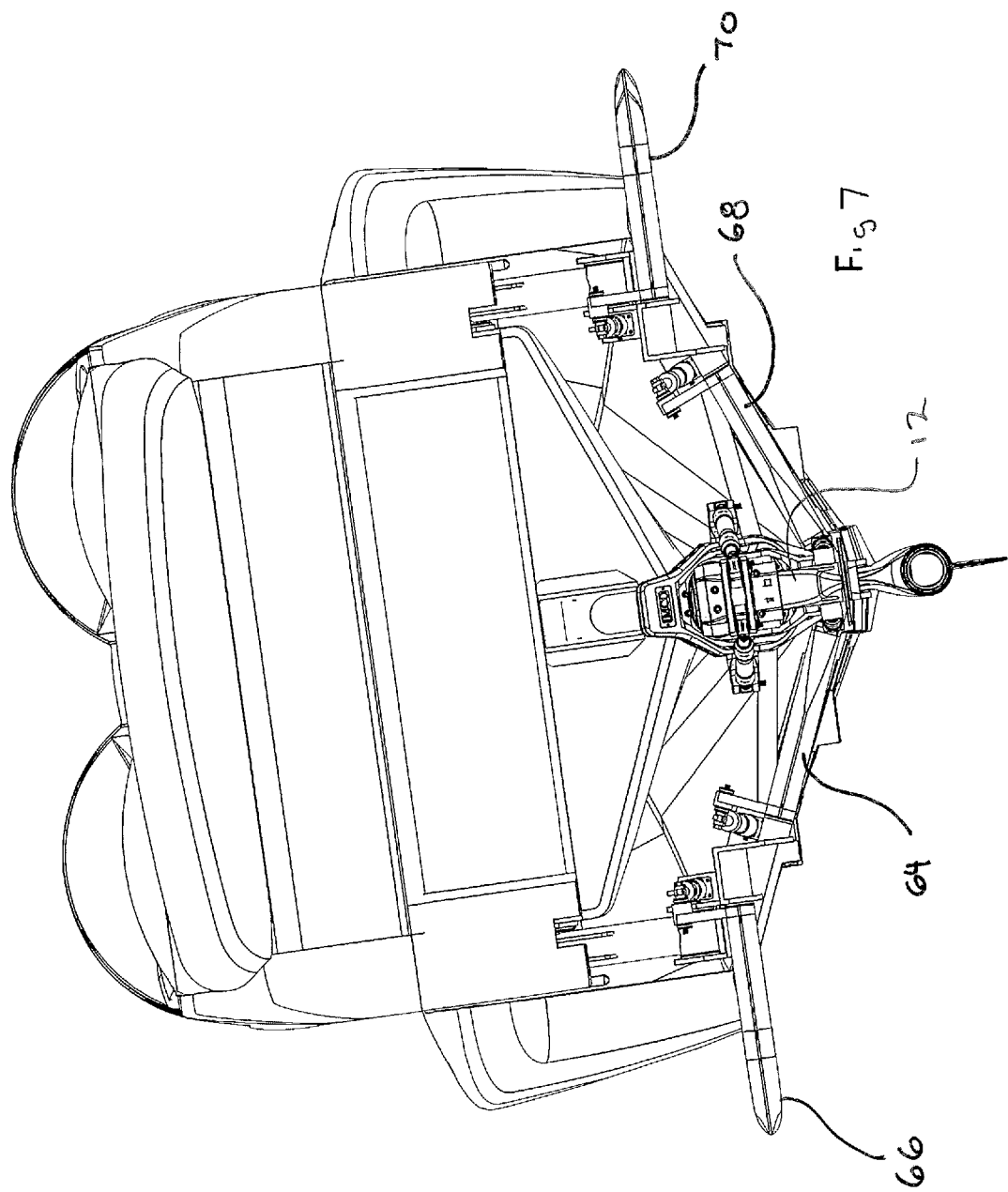
FIG. 7 is a rear view of the vessel.
Figure 8:
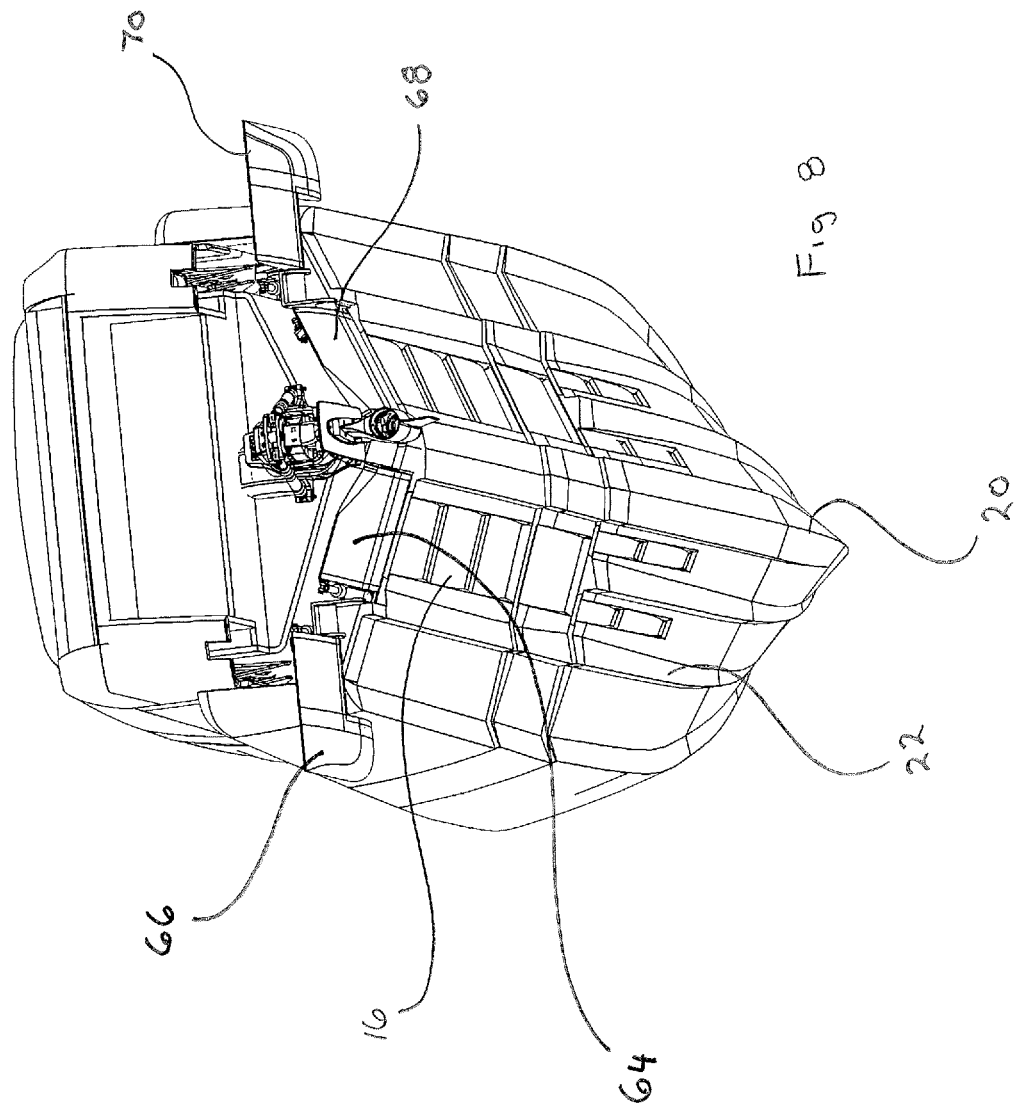
FIG. 8 is a rear perspective view of the outer hull's louvered configuration.

FIGS. 7 and 8 show the vessel 2 with the propulsion and steering systems incorporated. As can be seen the jet drive 12 (or propeller) component of the propulsion system is affixed to the inner surface of the outer hull 6 as are the elevon (flaps) 64/66/68/70 of the steering system. Operation of these components are described and charted further herein.

When the vessel 2 is sitting in the water, it is held afloat by the inner hull 4 and the outer hull 6 is partially submerged below the waterline. At this time the operative space 10 is also filled with water.

Figure 9:
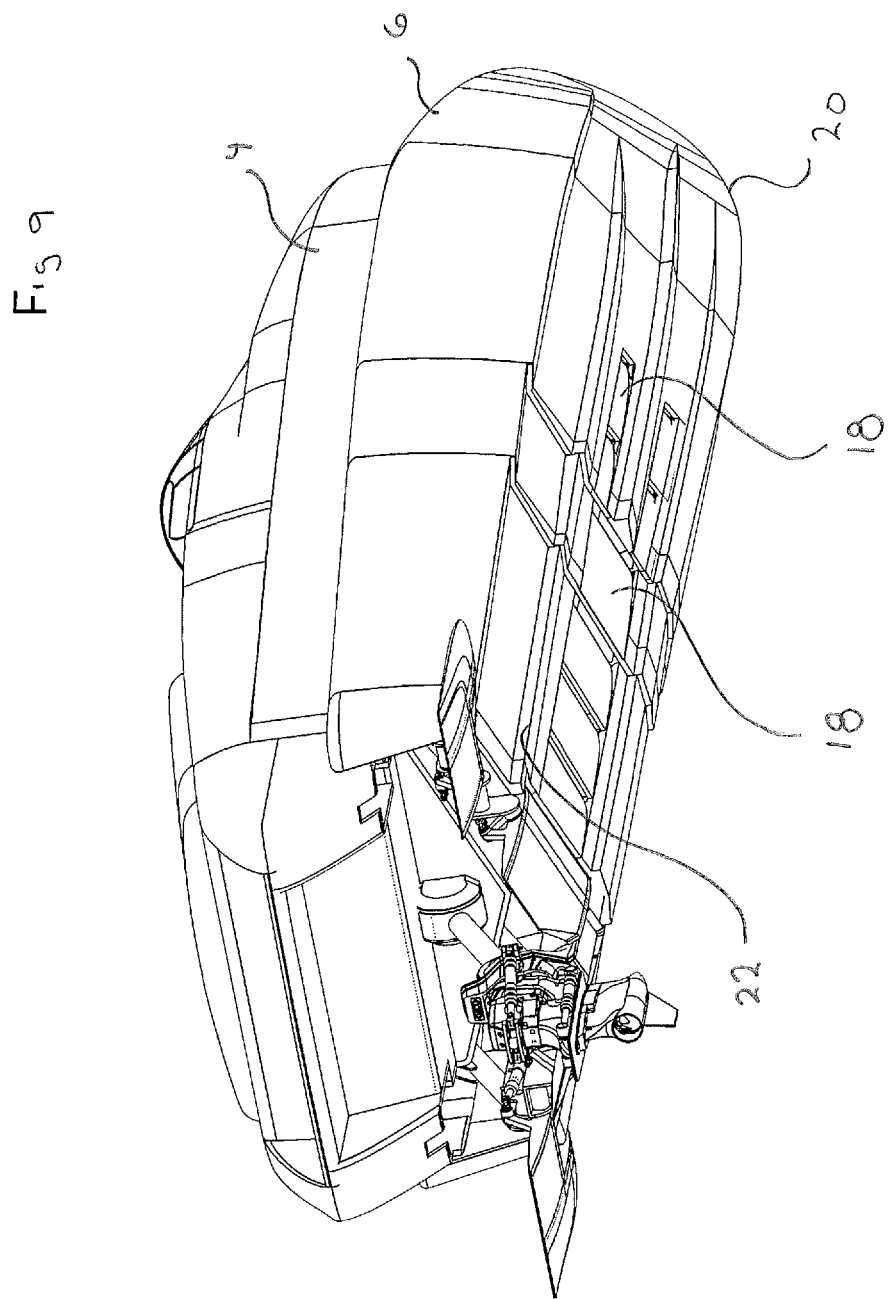
FIG. 9 is a side perspective view of the outer hull's louvered configuration.
Figure 10:
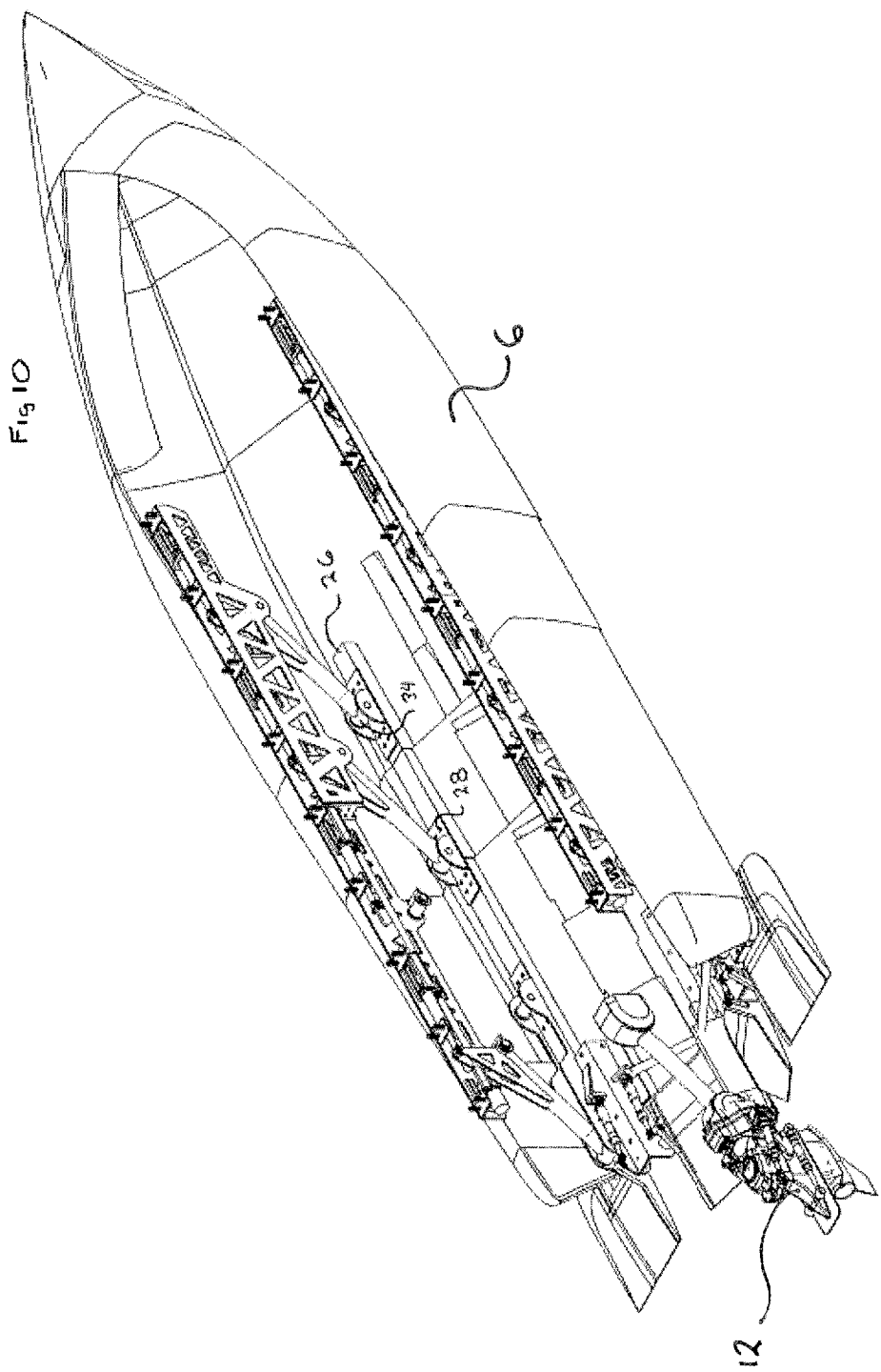
FIG. 10 is a side perspective view of the vessel with the inner hull removed.

Looking at FIGS. 8 and 9 the configuration of the outer hull's bottom can best be seen. The outer hull 6 has a series of various sized, fixed louvers 18 incorporated in equally spaced pairs about the longitudinal centerline of the vessel, from the bow to stern. The fixed louvers are all angled with respect to the bottom surface of the outer hull 6 such that each fixed louver has a leading edge nearest the bow of the vessel that is vertically raised with respect to the trailing edge of the fixed louver that is nearest the stern of the vessel. When first in forward motion the water between the inner hull 4 and the outer hull 6 rushes out the open back of the outer hull 6 coming from the operative space 10. Any remaining water in the operative space 10 is drawn downward and outward through the louvers 18. Once this has happened then air is continuously drawn from the operative space 10 down through the louvers 18 such that there is no water between the hulls and the outer hull 6 is now riding on a thin film of air or bubles. The vessel's only contact with the water at this point would be portions of the deep Vee 20 and portions of the side flats 22 of the outer hull 6.

There are no louvers 18 at the bow of the outer hull 6 because when in motion the outer hull rises from the water as the boat planes. Riding on a plane of air rather than water reduces the power required to attain a speed and reduces the fuel consumption required to operated at that speed. This effect is similar to the increase in efficiency a moving boat experiences when it leaves still water and enters a wave chop. In that situation the boat will speed up for the same power output and propeller rpm because the drag (suction and surface tension effects) on the boat has decreased. In the preferred embodiment there are three sizes of louvers used. Although only exemplary, in the preferred embodiment with a vessel in the 20 to 25 foot length range, the first louver is 2 inches deep and 7 inches wide. The second louver is 2 inches deep and 2 feet wide, and the third louver is 1.5 inches deep and 2 feet wide. This configuration has proven to be adequate for the evacuation of the operational space 10.

Looking at FIGS. 10 to 13 the suspension system 8 that resides between the outer hull 6 and the inner hull 4 in the operative space 10 can be seen raised (the extended configuration) without the inner hull 4 attached. The suspension system 8 has two independent sides that each lie substantially parallel to each other about the longitudinal axis of the boat. (Although there may be a slight toe in toward the bow of certain boats based on boat length and design.) The bottom end of the suspension system has a series of outer hull mounting or base plates 24 that are bolted atop reinforced mounting pads 26 affixed to the inside of the outer hull 6. Although not illustrated the preferred method of affixation is through studs that extend upward from the top face of the mounting pads 26 and pass through orifices 28 in the mounting plates 24. It is to be noted that the rearmost of these mounting plates is a double mounting plate 72 (FIG. 17) that has a larger footprint and enhanced strength to stabilize the steering and propulsion components as described herein. The outer hull mounting plates have a pair of lower strut axle support plates 30 that extend normally therefrom. Between this pair of support plates 30 extends, and is affixed, a lower strut axle 32 that passes through a lower strut axle bearing or bushing (not visible) housed in the lower strut mount portion 34 of the strut 36. Affixed, preferably by welding, longitudinally along the upper end of strut 36 is a pair of parallel, triangular gusset plates 38. These gusset plates 38 extend from approximately the longitudinal midpoint of the strut 36 to the to the upper strut mount portion 40. Two of the bottom corners of the gusset plates are affixed to the strut 36 while the top corner is pivotally attached to the shock absorber rod 50 by a shock absorber rod mount 51 also having a short axle extending therefrom that is rotatably housed in orifices formed adjacent the vertices of the gusset plates.

The top end of each of the two independent sides of the suspension system is affixed to a rail box 42, each of which has a pair of planar rail side plates 44 held in parallel configuration by several spacer plates 46. The spacer plates 46 have a "Tee" backbone with the top plate bolted to reinforced sections of the inner hull 4 such that the suspension system 8 is the connecting member between the inner hull 4 and the outer hull 6. This is accomplished in the following manner.

The paired planar side rail plates 44 have a matched set of upper strut axle orifices that house an upper strut axle 48 that passes through an upper strut axle bearing or bushing (not visible) housed in the upper strut mount portion 40 of the strut 36. This pivotable connection is similar to the pivotable connection made between the lower strut mount portion 34 and the outer hull mounting plate's lower strut axle mounting plates 30.

Each spacer plates 46 "Tee" backbone has a horizontal plate and a vertical plate. The vertical plates have aligned drive rod support orifices formed therethrough that rotatably support the drive rod 58. Extending normally from the vertical plate are a pair of shock absorber guides 52. These guides have opposing concave faces that house the shock absorber cylinder mount 54. This mount 54 is attached to the cylinder end of the shock absorber and is made of a shock absorber cylinder mounting eye with a short pivotable axle passing through it that has sliding surfaces on either of its axle ends, matingly conformed to the concave faces of the shock absorber guides 52, where they are slidingly housed. This mount 54 is affixed to the floating nut 56. This floating nut 56 is rotatably engaged about a threaded portion of the shock absorber drive rod 62.

On the last spacer plate of each rail box 42 is mounted a drive motor 60 connected to one end of the drive rod 58.

Figure 14:
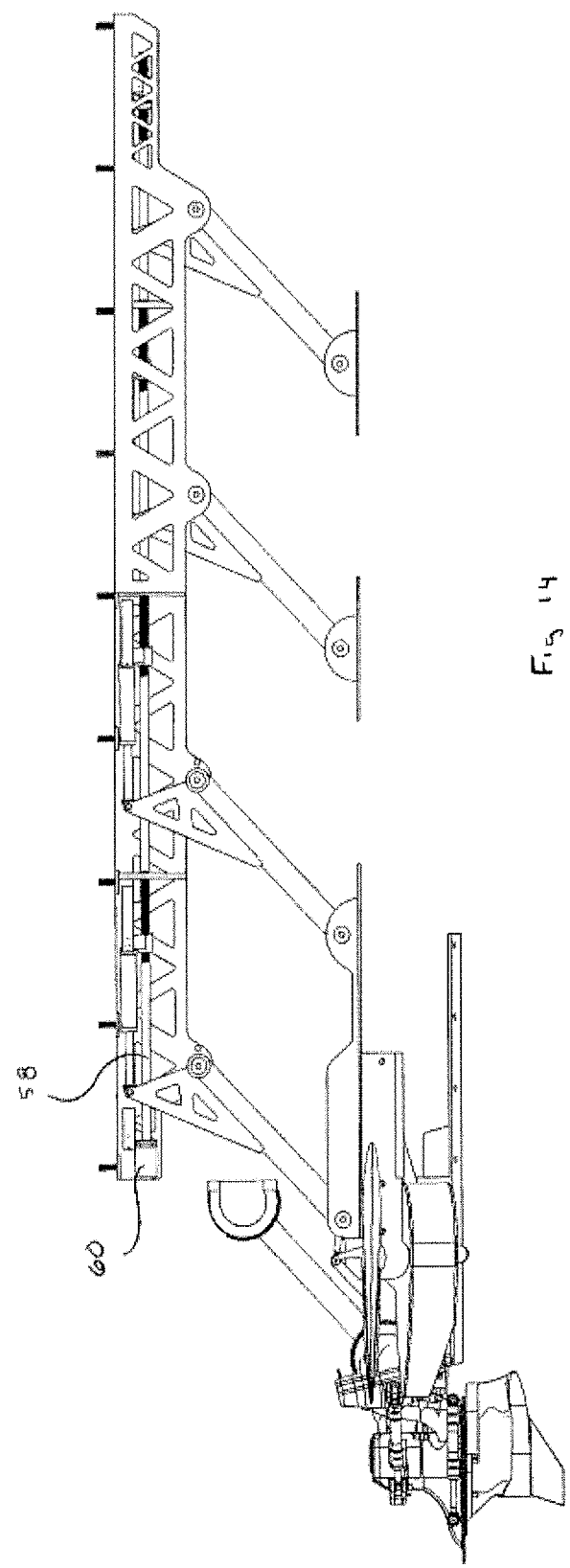
FIG. 14 is a side view of the extended suspension system.
Figure 15:
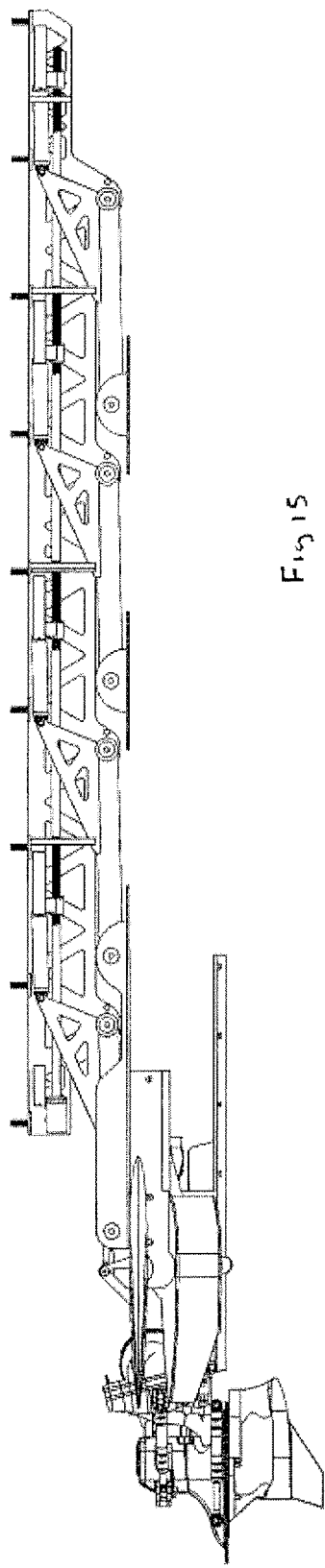
FIG. 15 is a side view of the collapsed suspension system.

The suspension system 8 both dampens movement between the inner hull 4 and the outer hull 6, and serves to lift the upper hull 4 out of its cradled position within the lower hull 6. This can best be explained by reference to the boat in the extended configuration of FIG. 14 (raised) and the retracted configuration of FIG. 15 (lowered). In operation, the drive motor 60 in its electric, pneumatic or hydraulic form, spins the drive rod 58 which is supported and rotates within the aligned drive rod support orifices of the numerous spacer plates 46 in the rail boxes 42. As the drive rod 58 spins, the floating nuts 56 engaged on the threaded portions of the drive rod 62 move toward the bow or the stern of the boat (dependant upon the direction of rotation of the drive motor.)

To raise the inner hull 4 the floating nuts 56 will be driven toward the stern of the boat pushing the entire shock absorber 123 along its guides 52 toward the stern, which includes the shock absorber rod 50. This in turn pushes the top corner of the gusset plate toward the stern. This causes the strut 36 to pivot counterclockwise about the upper strut axle 48 and the strut to rise (increasing the angle included between the strut 36 and the mounting plates 24), thereby causing the inner hull 4 to rise from the outer hull 6.

To lower the suspension system 8 the drive motor 60 is driven in the opposite rotation of the above example. To lower the inner hull 4 the floating nuts 56 will be driven toward the bow of the boat pulling the entire shock absorber 123 along its guides 52 toward the bow, which includes the shock absorber rod 50. This in turn pulls the top corner of the gusset plate toward the bow. This causes the strut 36 to pivot clockwise about the upper strut axle 48 and the strut to decrease its internal horizontal angle with respect to the mounting plates 24, thereby causing the inner hull 4 to lower into the cavity in the outer hull 6.

Regardless of the position of the inner hull 4 and the outer hull 6, the shock absorber 123 dampens any motion between them as the shock absorber rod 50 is essentially connected to the outer hull 6 through the strut 36 and the shock absorber 123 is connected to the inner hull through the rail box 42. The suspension system is designed in multiples of the shock absorbed/strut assembly. In this way it may be adapted to any size or length of boat by simply adding more inner suspension modules to fit whatever length of boat is desired. Since the raising or lowering of the boat is accomplished by spinning the drive rod 58, as is well known in the art this could be accomplished with a hydraulic, pneumatic or electric drive motor.

Figure 2:
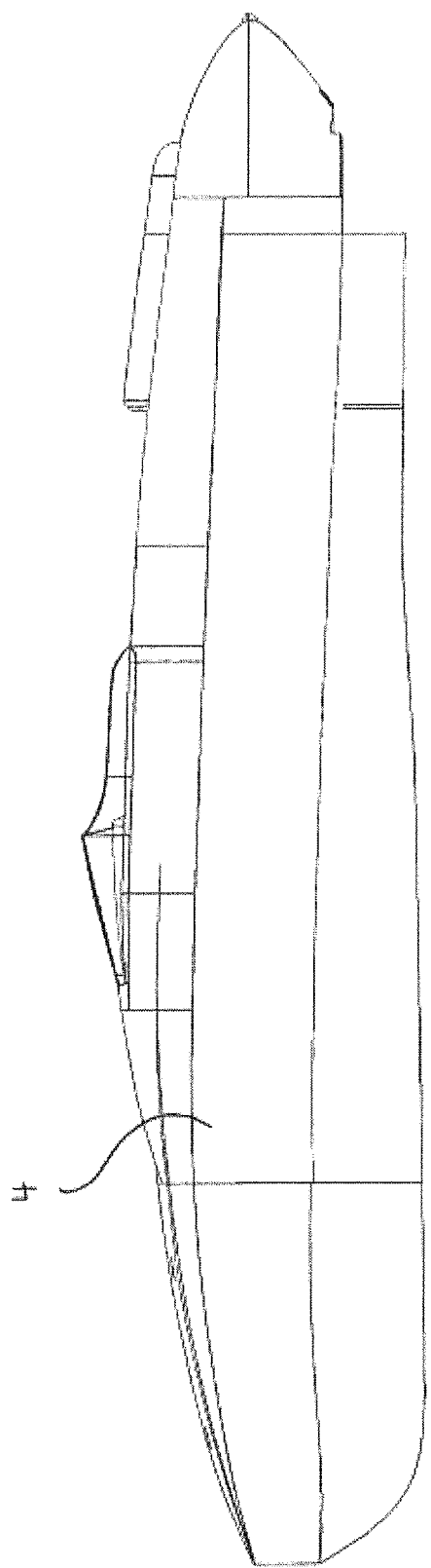
FIG. 2 is a side view of the inner hull with the propulsion and steering systems removed for clarity.
Figure 3:
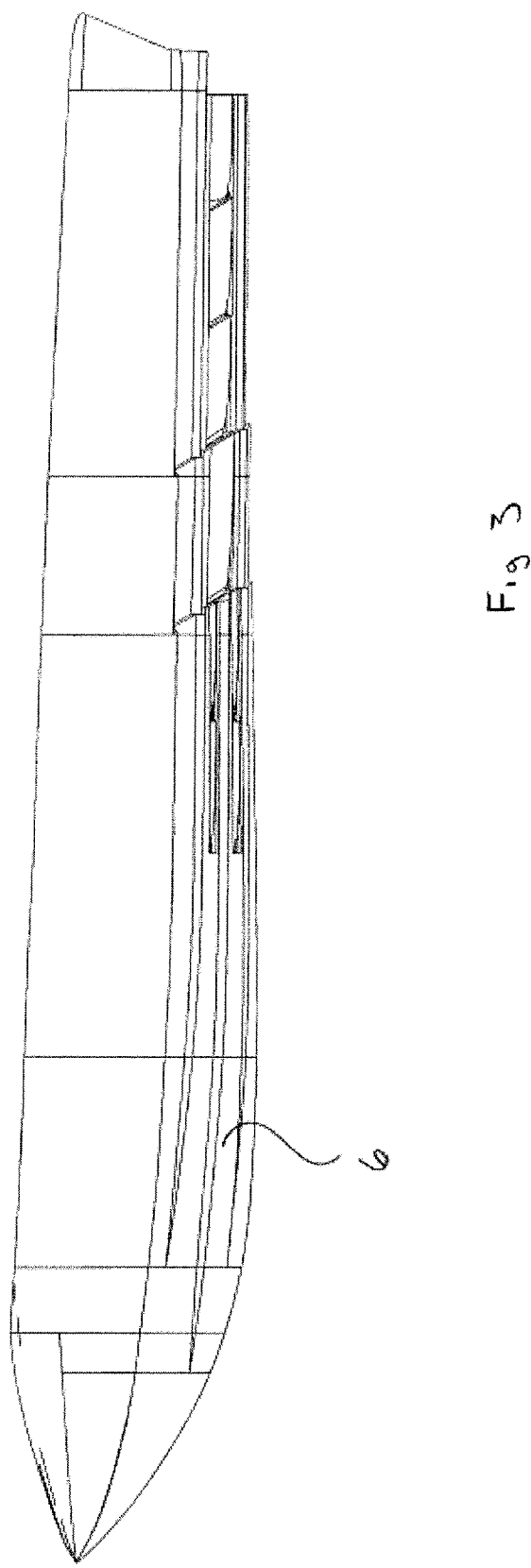
FIG. 3 is a side view of the outer hull with the propulsion and steering systems removed for clarity.
Figure 4:
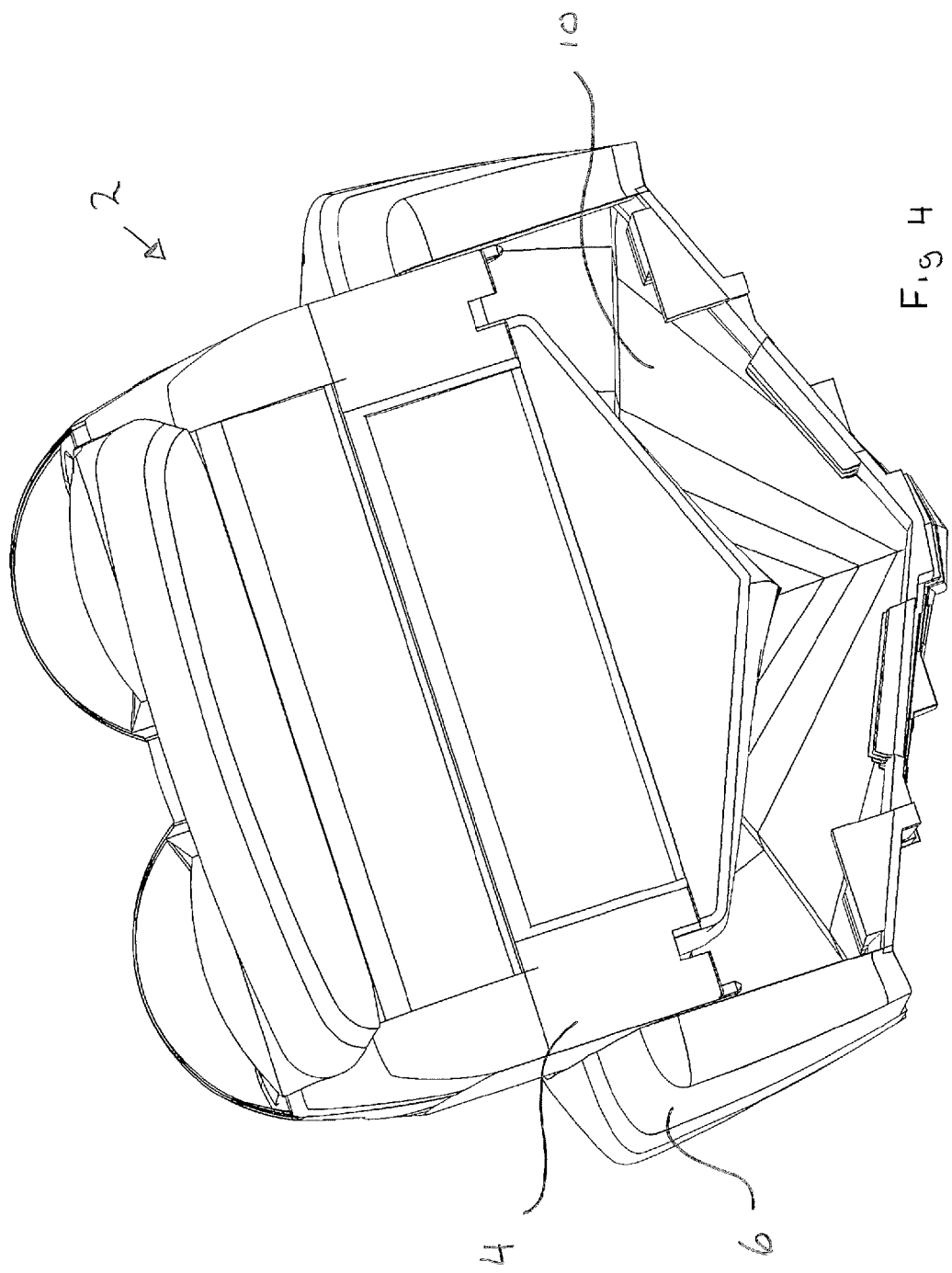
FIG. 4 is a rear view of the vessel with the propulsion and steering systems removed for clarity.
Figure 5:
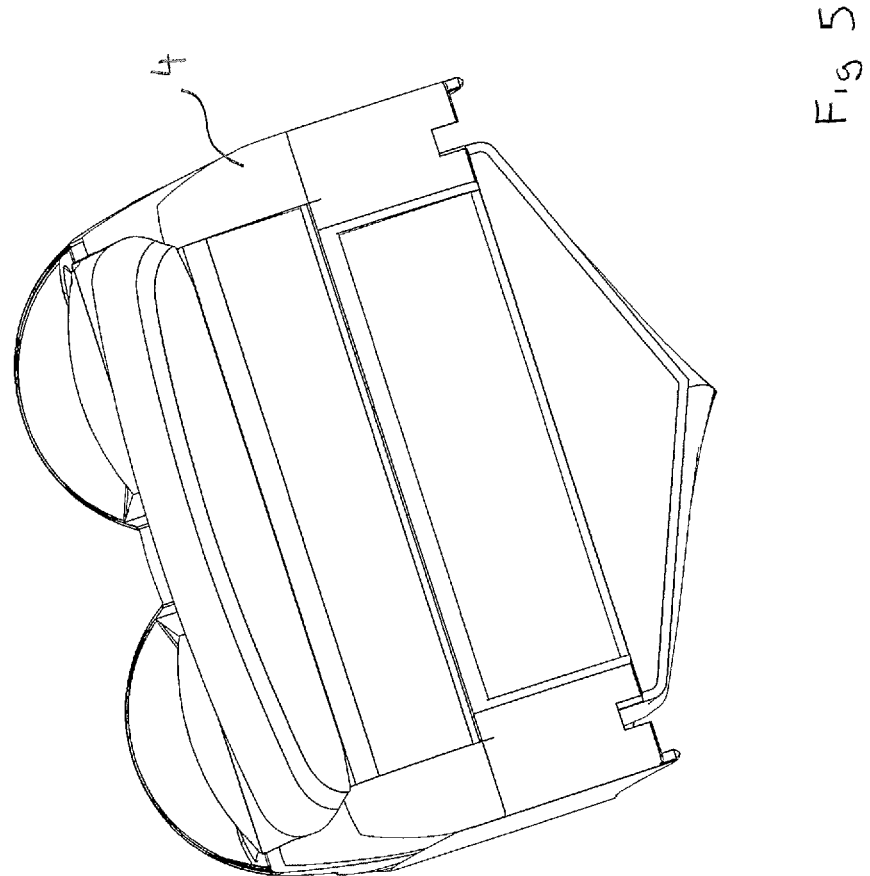
FIG. 5 is a rear view of the inner hull with the propulsion and steering systems removed for clarity.
Figure 6:
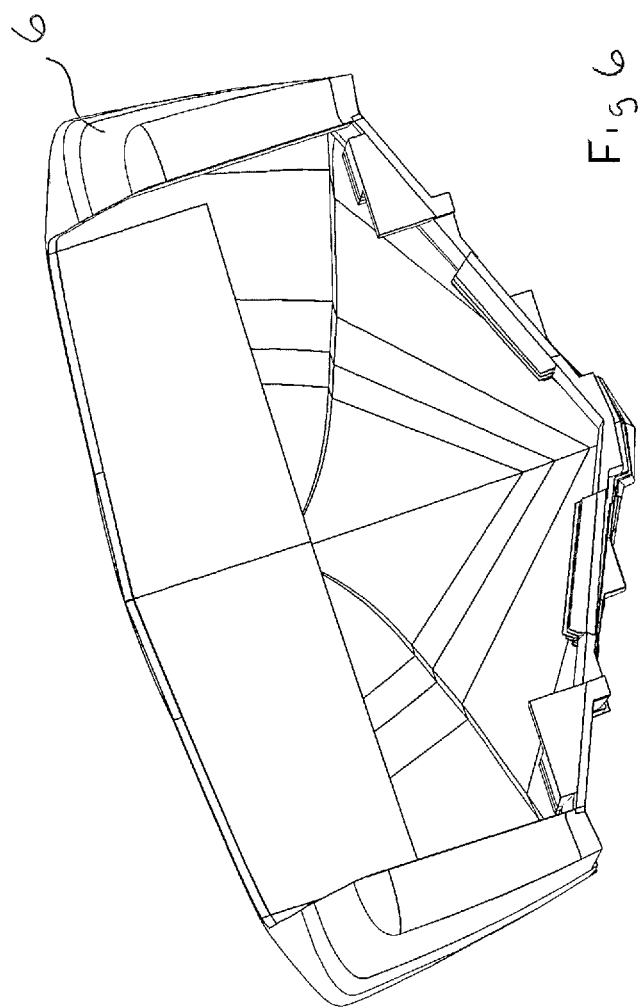
FIG. 6 is a rear view of the outer hull with the propulsion and steering systems removed for clarity.

As can be seen comparing FIGS. 1 and 2 as the inner hull 4 is raised above the lower hull 6, the acute angle formed between the struts and the base plates increases, and the inner hull 4 moves slightly back with respect to the outer hull 6 by virtue of the operation of the pivoting struts 36.

There are two main advantages of the ability of the boat to raise its inner hull 4 above its outer hull 6. First, this allows a suspension system to be placed between the two sections of the boat such that the ride the passengers experience in the upper hull 4 is smooth. Second, with the inner hull 4 raised above the waterline, it reduces the friction of the moving vessel in the water. With the lower hull's louvered design as described earlier, there is diminished drag on the vessel and much of the outer hull 6 rides on bubbles.

The steering and stabilization system act as an integrated system. Looking at FIGS. 7, 8, 9 and 12 it can best be seen that at the rear of the boat there are four elevon flaps that are used to control the braking, and the steering as well as the controls for the list (side to side tilt), skew (left to right path deviation), and trim (forward to back balance of the boat). There is an inner left elevon 64 and outer left elevon 66 and an inner right elevon 68 and an outer right elevon 70. The inner elevons are angled to conform to the boat's lower hull configuration of a deep "Vee". The elevons may act as ailerons or elevators depending on the situation and the position of their leading edges. They can steer side to side or cause the bow to come up or down as detailed in the following table.

| Positions of Steering Stabilization System Elements with Applied Function (describes the position WRT the elevon's leading edges) | | | | |
|---|---|---|---|---|
| | Outer Elevon Position | | Inner Elevon Position | |
| Applied Function | L Elevons | R Elevons | L Elevon | R Elevon |
| braking (with foot pedal or joystick) | up | up | down | down |
| turn right (w joystick or steering wheel) | up | down | up | down |
| turn left (w joystick or steering wheel) | down | up | down | up |
| stabilizing function (gyroscope tilt controls as boat rolls to left) | up | down | up | down |
| stabilizing function (gyroscope tilt controls as boat rolls to right) | down | up | down | up |
| adjusting the bow up & stern down (joystick) | down | down | down | down |
| adjusting the bow down & stern up (joystick) | up | up | up | up |

Figure 16:
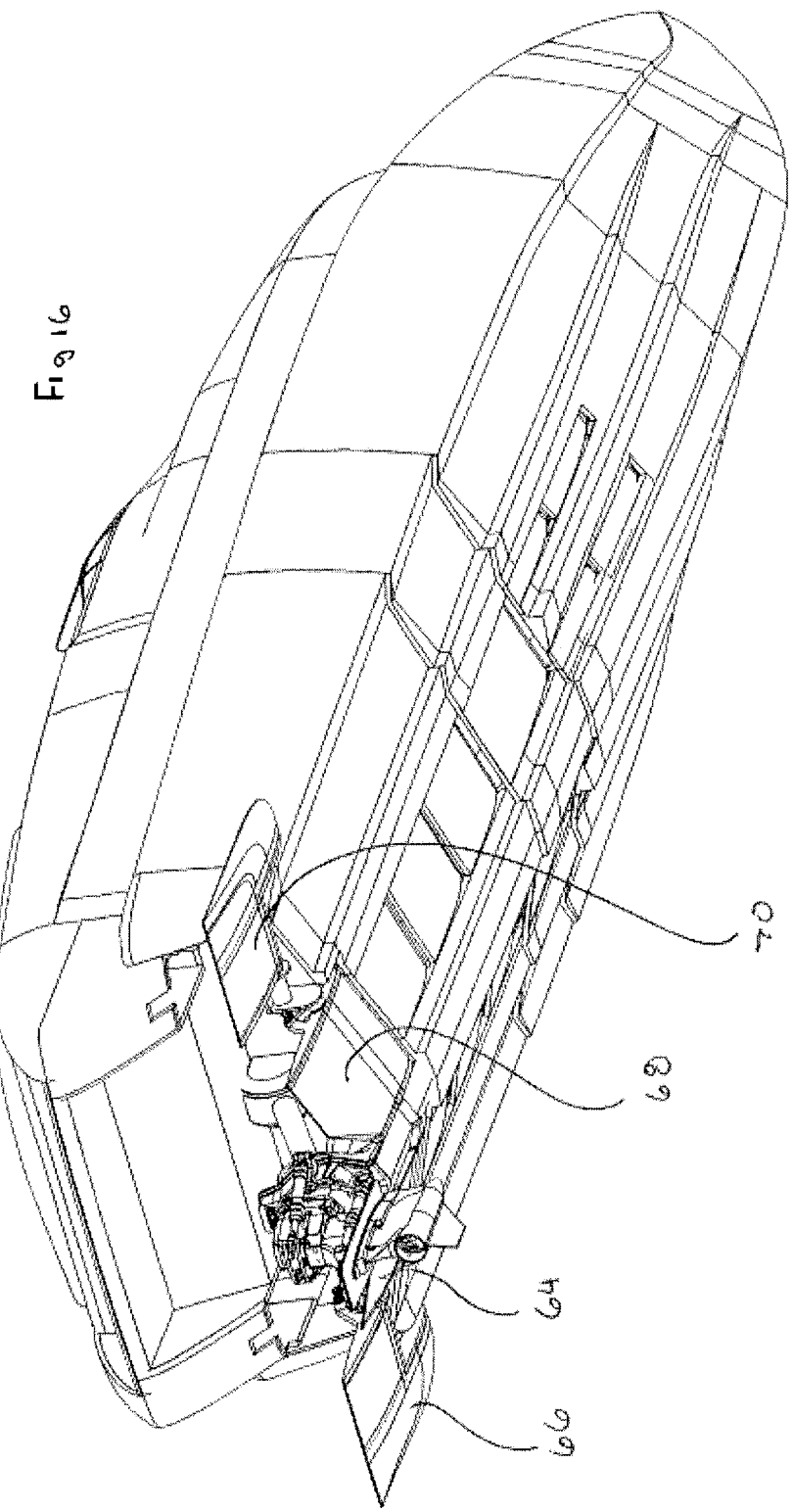
FIG. 16 is a rear bottom perspective view of the outer hull.
Figure 17:
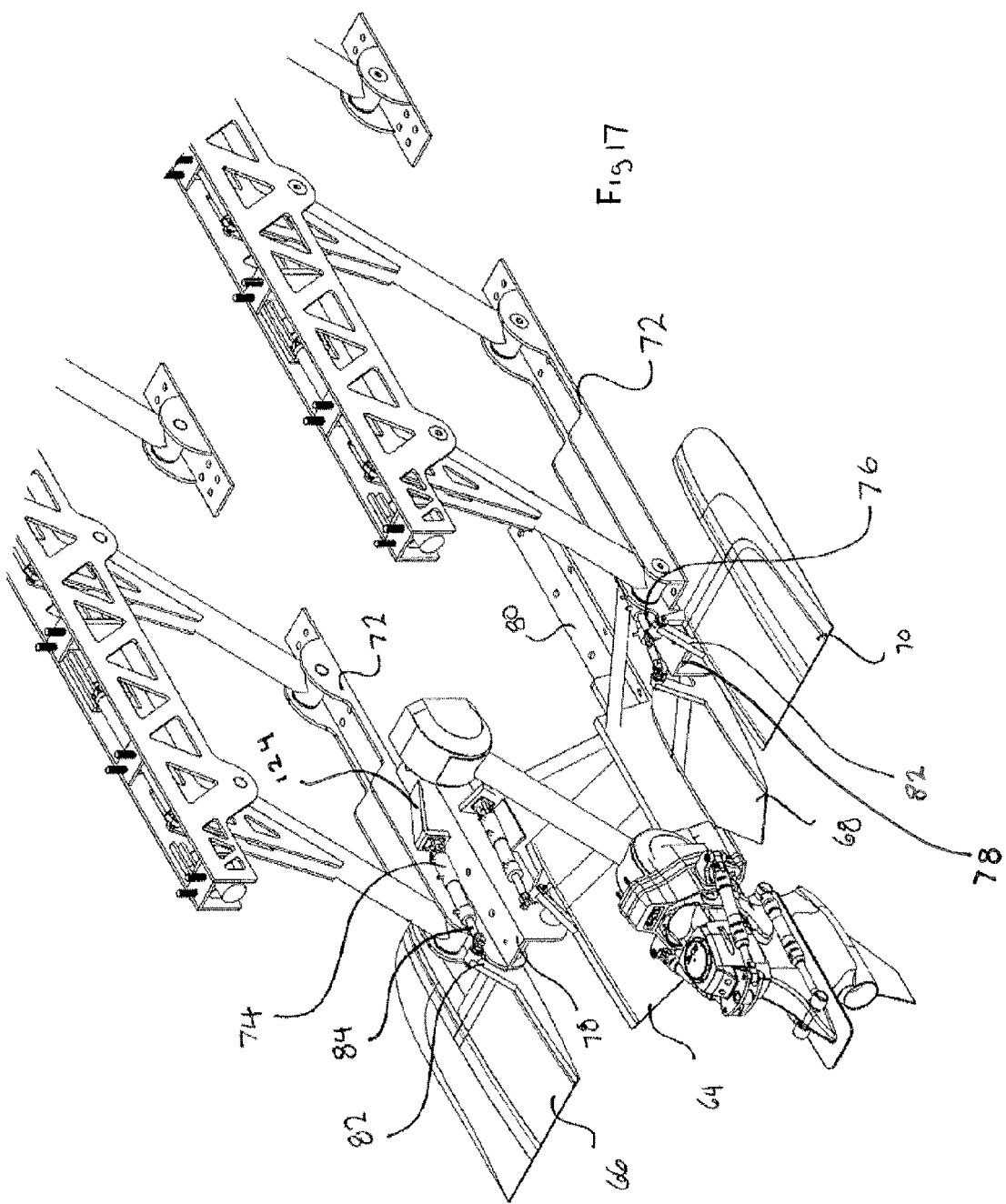
FIG. 17 is a top side perspective view of the steering and braking system.
Figure 18:
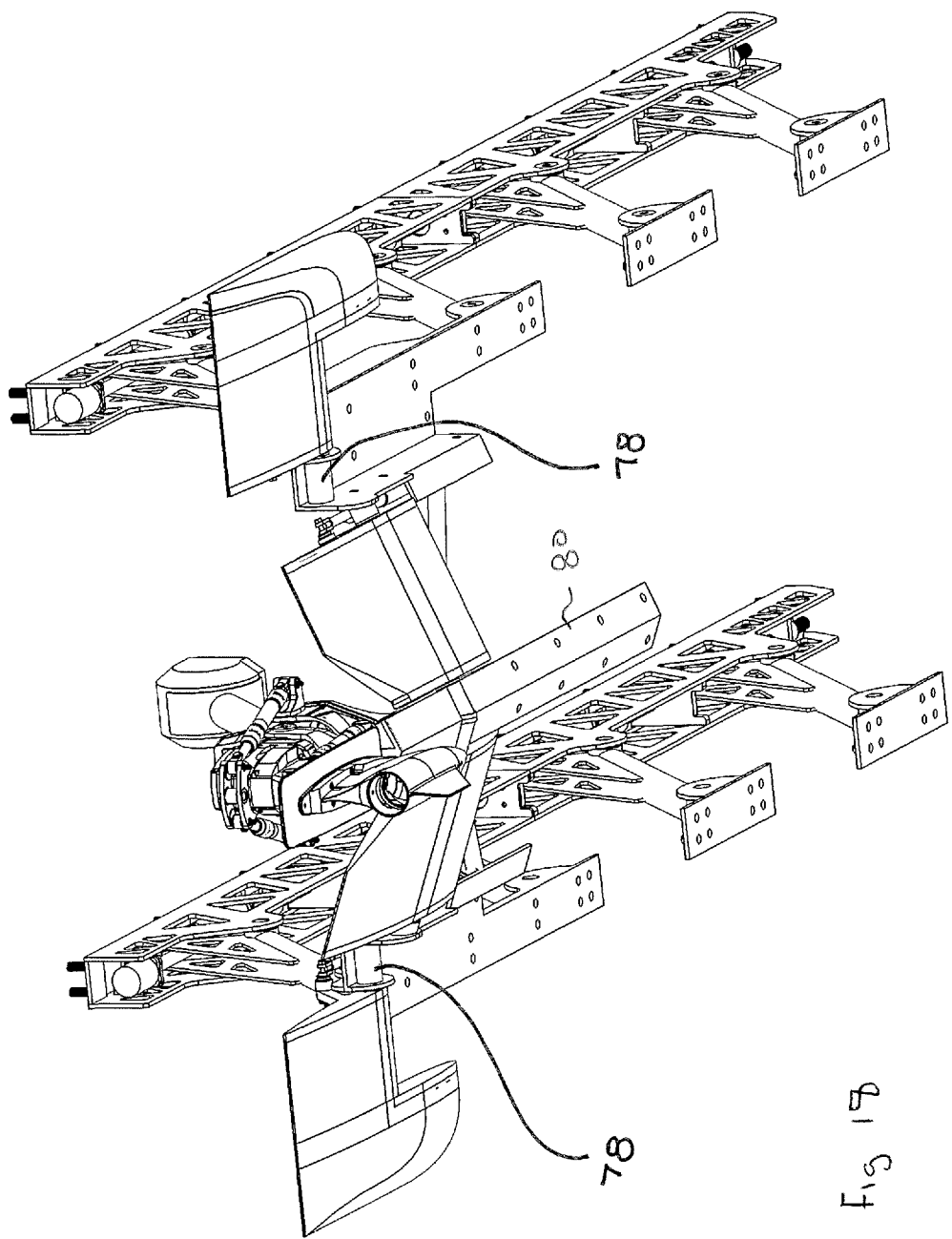
FIG. 18 is a bottom rear perspective view of the steering and braking system.
Figure 19:
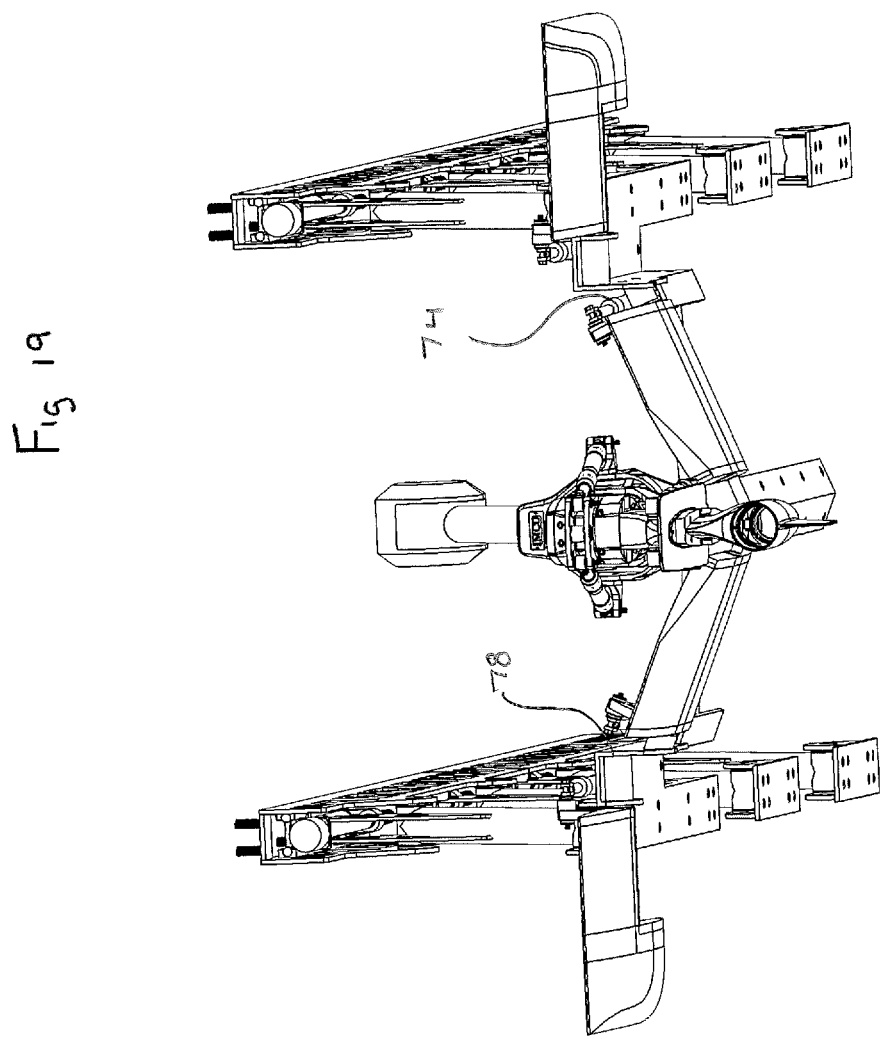
FIG. 19 is another bottom rear perspective view of the steering and braking system.
Figure 20:
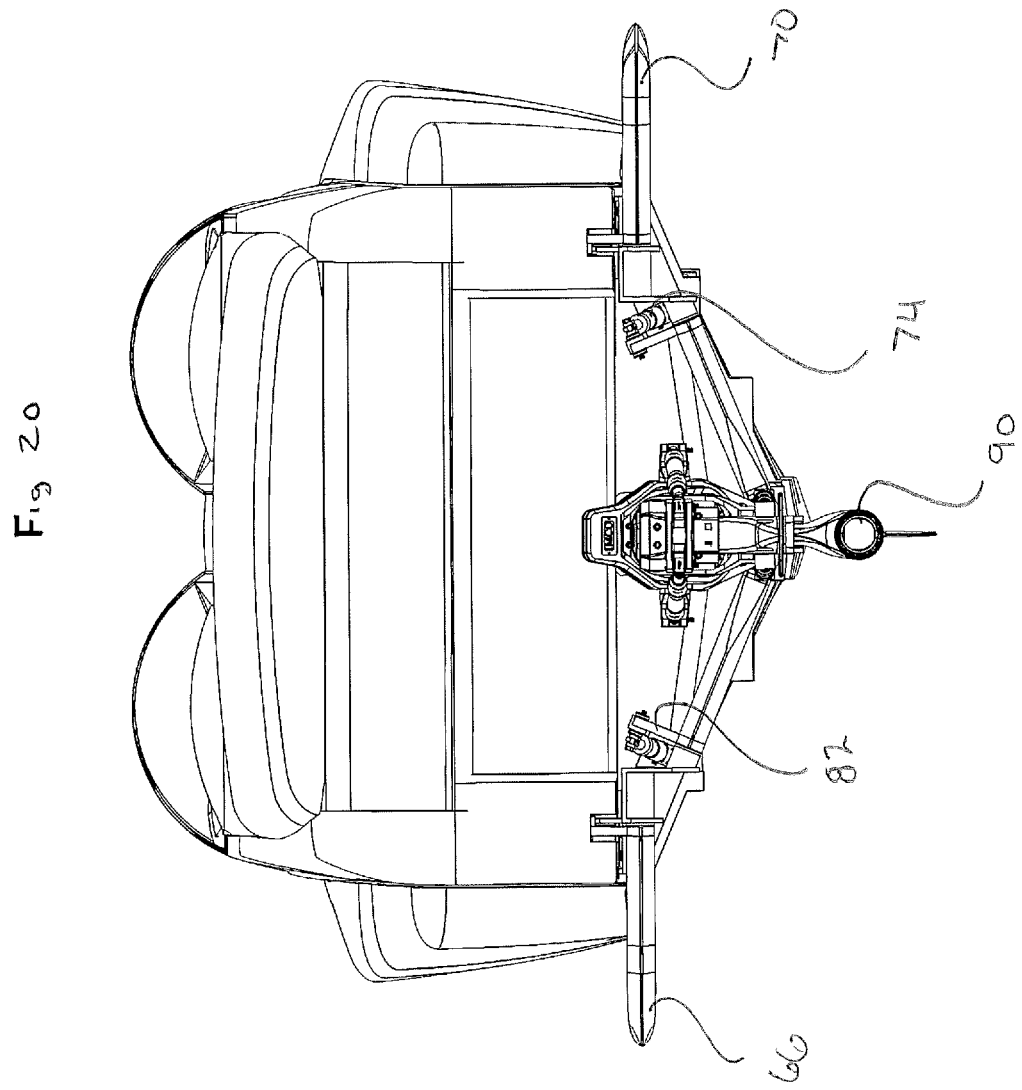
FIG. 20 is a rear view of the dual hull vessel.

Looking at FIGS. 16, 17 and 18 it can be seen that these four tiltable elevons are mounted to the stern of the outer hull 6 at the double hull mounting plates 72. Each elevon is pivotable about an axle that extends through each elevon in front of the axial midpoint of the elevon. The two outer elevons 66 and 70 have a stub axle (not visible) running through a mounting bracket 78 that extends from the upper surface of the elevon in front of the axial midline of the elevon. This stub axle is affixed and supported only on its inboard end to an axle bracket 78 that is welded to the double mounting plate 72. The two inner elevons 64 and 68 each have a full axle passing axially through them that is affixed and supported at its outboard end to the axle bracket 78 that is welded to the double mounting plate 72, and on its inboard end to an inboard support bracket extending from the Vee support plate 80 affixed to a strengthened section of the outer hull 6 along the bottom Vee. All of the elevons have pivot brackets 82 that extend normally from the top surface of the elevons and which lie forward of their axles. These pivot brackets 82 have the moveable end of the hydraulic cylinder arms 84 affixed thereto. The outer end of the hydraulic cylinders 74 are affixed to the mounting brackets 124. When the hydraulic cylinders 74 are extended or retracted they pivot the elevons such that their leading edge moves up or down. Control and operation of the hydraulic cylinders is via a manual or automatically controlled hydraulic system as is well known in the field.

The axles for the elevons are oriented perpendicular to the longitudinal axis of the boat 2 and the elevons are mounted on the axle 36 just slightly ahead of their axial centers. Preferably the location of these axles will be $^{18}/_{42}$ of the elevon's longitudinal length from the leading edge. This dimension has proven to be the best operational dimension however a deviation plus or minus 10% has been shown to be acceptable. Thus it will always take force to tilt any of the elevons' leading edges into the water. To tilt any elevon further into the water will take increasing force since the surface area of each elevon from its leading edge to the axis of tilt is less than the surface area from the axis of tilt to the trailing edge. As the moving water passes over the tilting elevon more force acts upon the rear of the elevon to try to keep the elevon horizontal (or return it to a neutral position.) In this manner when under power, a rogue wave cannot grab the leading edge of any elevon and pivot its position normal to the plane of forward motion of the boat, bringing it to an unexpected, abrupt stop. Although more water force is acting upon the rear of the elevon and less water pressure is acting on the surface of the elevon's leading edge, the exact location of the pivotal axis (positioned at $^{18}/_{42}$ of the longitudinal length from the elevon's leading edge) has been shown to reduce at least 40% of the pressure normally required from the hydraulic cylinders to move the elevons.

Operation of the hydraulic system to manipulate the elevons allows for a much finer control over the positioning of the boat. In the way of examples, the bow may be raised in rough water when running with the waves to keep the boat from pearl diving (nose of boat plunging into the water) and when running the boat at slow speed for wake surfing etc. It cuts a deeper groove in the water making a bigger wake. The bow can also be pushed down to bring the bow into a piercing mode for the cresting swells the boat must penetrate as the boat is going out to sea.

The elevons can be controlled by three devices, the steering means (a steering wheel or joystick), the computerized gyroscope or accelerometer (for stability), and the brake pedal (for braking and enhanced turning.) Each of these three devices send a signal to an elevon manipulation system. Physical movement (positioning) of the elevons is by hydraulic manipulation although pneumatic and electric servo motor manipulation has been successfully tested and are acceptable substitutes that do not depart from the scope of the invention. Such positioning systems (hydraulic, pneumatic and electric) have been utilized in the mechanical field of aviation for years and the details of their operation and the specific configuration and selection of their integral components do not comprise part of the present invention. For visual clarity the hydraulic elevon manipulation system has been eliminated from all figures.

Although smaller vessels or boats will generally only require the rear mounted elevons, larger, performance boats may utilize at least one additional flap or elevator positioned towards the bow of the outer hull or in a tunnel boat hull, between the two outer hulls.

When under power, the steering means of the boat 2 enable the turning of the boat's stern drive or jet nozzle 12 (or propeller) at the rear of the boat 2 which redirects the thrust of the water pushed past the jet to steer. There are numerous configurations of power sources for the propulsion of the boat that are well known in the field however in the preferred embodiment, the power source will be located or housed in the inner hull 4 and the stern drive or jet 12 will be affixed to the rear of the outer hull 6.

Since the boat has a horizontal split between the hull section 6 and the body section 4 when in the elevated configuration the increased body section height enhances the motion experienced by the passengers as they are further from the axis of the roll, pitch and yaw of the passenger compartment as waves pass under the boat 2. Under power though, the boats's predominant motion is roll. Hence, the need for a stabilization system to minimize the side to side rocking. This is a accomplished by a computerized gyroscopic control unit that accomplishes a fast response to minimally tilt down the leading edge of the elevons 40 on the opposite side the boat is rocking towards and to simultaneously minimally tilt the trailing edge of the elevons 40 on the side the boat is rocking toward. These elevon actions will compensate for the roll of the boat when moving under power by counteracting the side to side forces. Essentially, the stabilization system's gyroscope continually adjusts the elevons when the boat is under power and traveling in a straight line, or under minimal steering so as to maintain a level position for the inner hull 4 of the boat 2 on a stable turn, BUT when making a sharp turn (once the steering means is moved beyond a certain position) the steering means position then minimizes any gyroscope or accelerometer control signal allowing a higher percentage of control to be given to the operator of the boat.

Also when under power and encountering rough water conditions, the boat 2 will also pitch (the up and down rocking motion of the boat's bow and stern.) Here the computerized, gyroscopic, stabilization control unit of the stabilization system acts to minimize the up and down rocking of the boat's bow and stern. This gyroscope accomplishes a fast response to accordingly tilt down or up the leading edges of the forward elevons 40 in unison. Furthermore, at the rear of the boat the elevator 42 is simultaneously being controlled by the computerized gyroscope control unit in a fast down and up motion to minimize pitch.

It is to be noted that the computerized, gyroscopic, stabilization control unit of the stabilization system acts actually employs two gyroscopes, one to stabilize the pitch and one to stabilize the roll. In other words, the elevons' actions will compensate for the pitch of the boat 2 when moving under power by counteracting the up and down forces of the bow and stern. Essentially, the stabilization system's gyroscopic control unit continually adjusts the elevons when the boat is under power and traveling in a straight line, or under minimal steering so as to maintain a level position for the body section 4 of the boat 2 or a stable turn.

Therefore the operator of the watercraft has full control of the pitch and roll by manipulating the control surfaces of the elevons accordingly. These control surfaces are used in the same way that a fighter pilot controls a fighter jet in the air therefore, the control surfaces on this watercraft are designed to control the watercraft even as it travels long distances through the air when encountering large swells.

Figure 21:
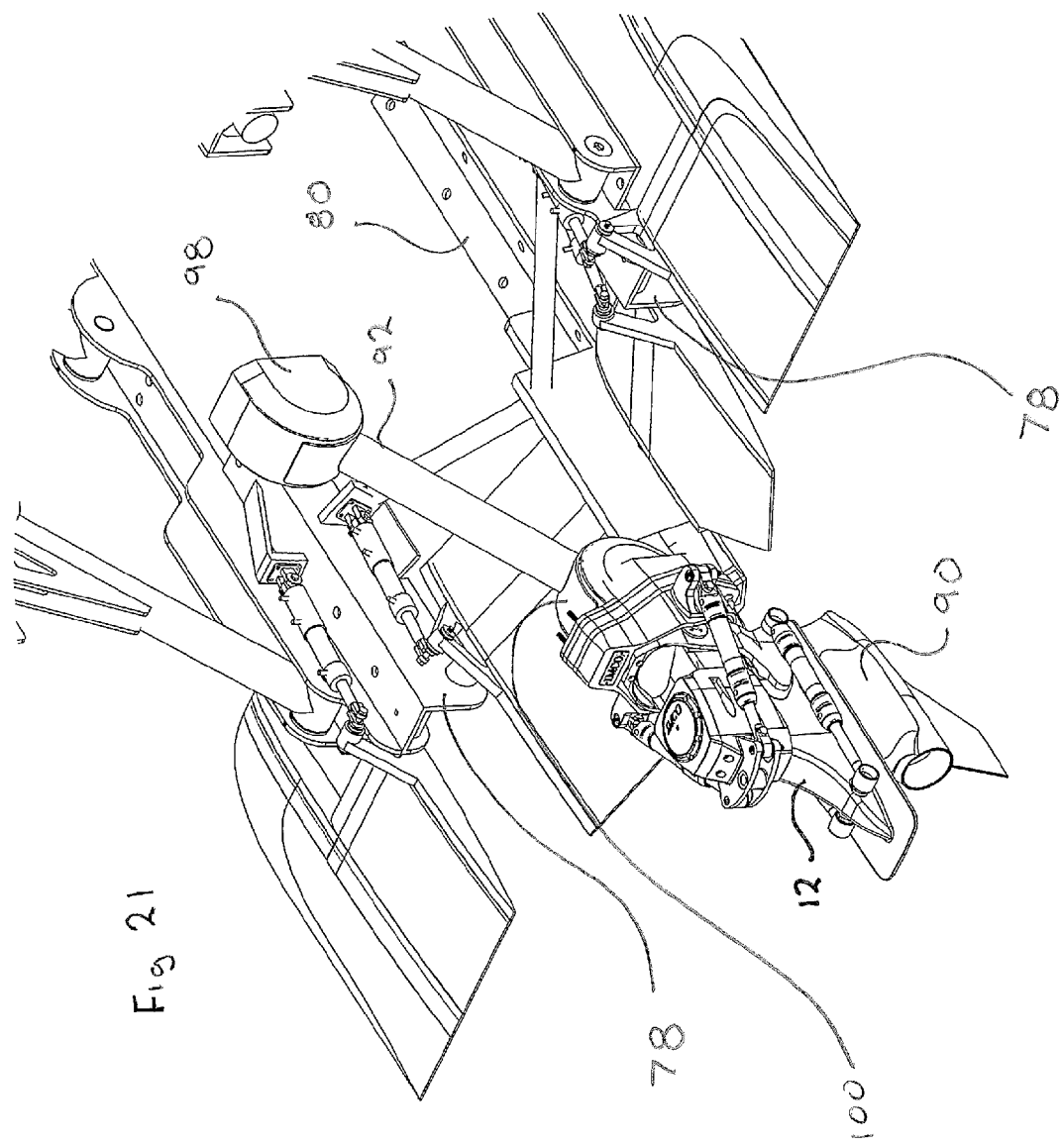
FIG. 21 is a partial rear perspective view of the power transmission unit and jet.
Figure 22:
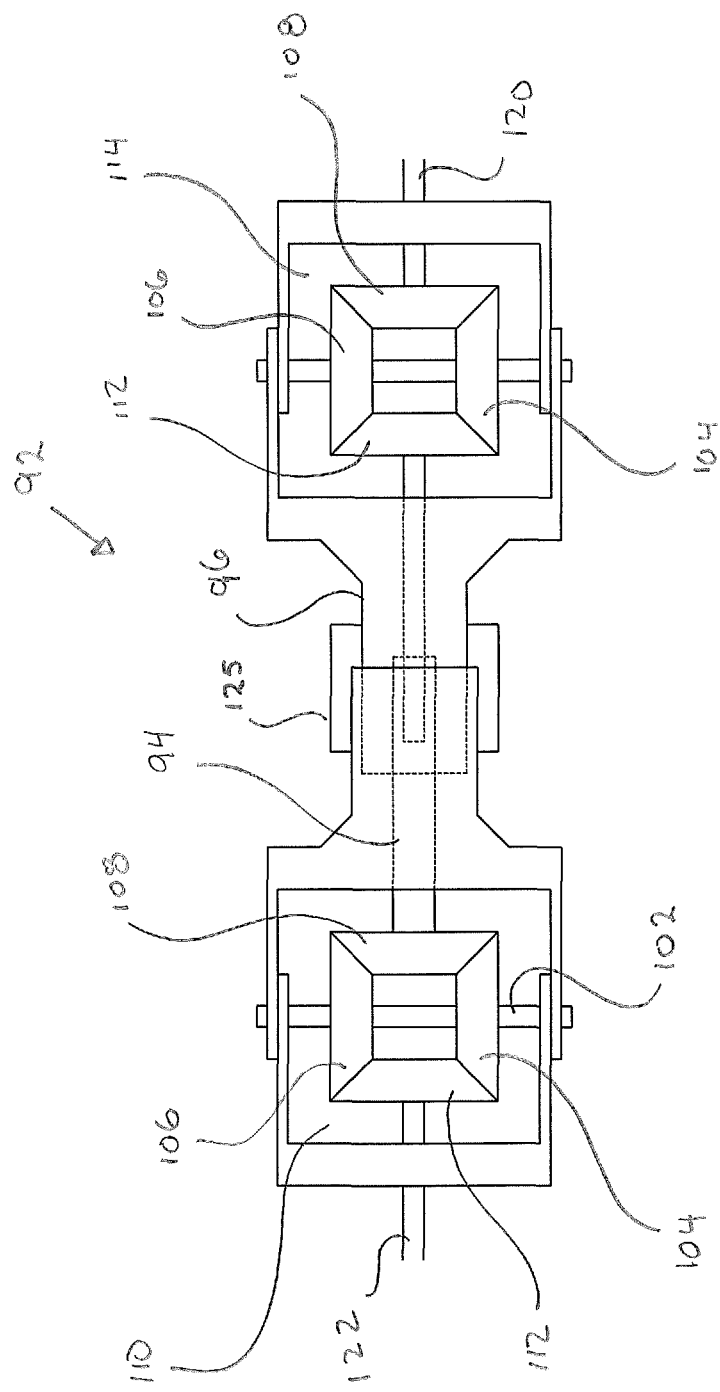
FIG. 22 is a phantom top view of the power transmission with the covers removed.

The steering of the boat is controlled in part by the positioning of the elevons, and in part by the direction of the stern drive or jet 12. This is accomplished via a hydraulic manipulation system although pneumatic and electric servo motor manipulation can also be used. The design and operation of the power source that drives the jet (not illustrated) are both well known in the industry. Looking at FIGS. 10, 18 and 21 it can be seen that the jet 12 is affixed to the outer hull 6, supported off of both the axle bracket 78 and the Vee support plate 80. Between the jet 12 and the power source lies a power transmission unit 92. (Best seen in FIG. 21) This unit 92 pivots at either of its ends as the inner hull 4 extends and retracts from the outer hull 6. In normal operation, as the transmission unit 92 pivots in an arc about a fixed point off of the outer hull 6, and the inner hull 4 pivots in an arc about a fixed point off of the outer hull 6, there should be no elongation of the transmission unit 92 as the hulls separate. However, to accommodate suspension twisting and quick compression movements the transmission unit 92 has a centrally located, splined telescoping driveshaft 94 as well as a telescoping housing 96 and optional boot cover 125 (FIG. 22). The connections at either end of the transmission unit to the jet 12 and the power source are by shafts as is well known in this field of art.

Looking at FIG. 22, a representative drawing of the transmission unit 92 with the top and bottom gearbox housings 98 and 100 removed, the structure and operation can best be explained. Basically, the transmission unit 92 is two sets of four grouped, 45 degree cut, beveled ring gears that are held in enmeshed, square configurations and connected by a splined, telescoping driveshaft 94. Each of these substantially similar gearboxes has a two piece open gearbox housing that is capable of pivoting about a central axle 102 that extends through each of the pieces and through the center of the right beveled ring gear 104 and the left beveled ring gear 106, supporting and constraining these gears. The splined driveshaft 94 extends normally from the front beveled ring gear 108 in the jet gearbox 110 and from the rear beveled ring gear 112 of the drive gearbox 114 so as to operationally connect the two gearboxes. The input shaft 120 is affixed to the front beveled ring gear 108 in the drive gearbox 114. The output shaft 122 is affixed to the rear beveled ring gear 112 in the jet gearbox 110. With this configuration, the front beveled ring gears 108 and the rear beveled ring gears 112 are free to rotate downward or upward simultaneously about the right beveled ring gears 104 and the left beveled ring gears 106, thereby accommodating the angular change in elevation between the power source and the jet 12. The input shaft 120 will continue to transmit torque to the output shaft 122 regardless of the angle or height differences of the transmission unit 12.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Having thus described the invention, what is claimed as new and desired to be secured by Letters Patent is as follows:

1. A hydroplaning vessel comprising:
 a non floatable outer hull with an open transom;
 a floatable inner hull;
 a suspension and inner hull lift system;
 wherein said inner hull is partially cradled within, and movably affixed to said outer hull by said suspension and inner hull lift system;
  wherein said outer hull has a bottom surface with at least one open, fixed louver formed there through;
  wherein said at least one fixed louver is angled with respect to said bottom surface such that said fixed louver has a leading edge nearest a bow of said vessel that is vertically raised with respect to a trailing edge of said fixed louver that is nearest a stern of said vessel;
  wherein said suspension and inner hull lift system is vertically extendable so as to be able to raise said inner hull a vertical distance above said outer hull; and
  wherein said suspension and inner hull lift system comprises:
 two linear series of base plates that lie substantially parallel to each other and along a longitudinal axis of the vessel and are rigidly affixed to said outer hull;
  two linear rail boxes that lie substantially parallel to each other and along a longitudinal axis of the vessel and are rigidly affixed to said inner hull; and
 at least two struts having a lower end pivotally connected to said base plate and an upper end pivotally connected to said rail box;
 wherein said suspension and inner hull lift system is adapted to raise and lower said linear rail boxes vertically with respect to said series of base plates.

2. The hydroplaning vessel of claim 1 wherein said struts pivotally reside between said base plate and said rail box at a first acute angle with respect to a longitudinal axis of said outer hull when said inner hull is fully lowered into said outer hull, and said struts reside between said base plate and said rail box at a second acute angle with respect to said longitudinal axis of said outer hull when said inner hull is fully raised from said outer hull.

3. The hydroplaning vessel of claim 2 wherein said second acute angle is larger than said first acute angle.

4. The hydroplaning vessel of claim 1 wherein said suspension and inner hull lift system further comprises:
 at least two reversing rotational drive motors each housed within one of said rail boxes;
 a series of parallel spacer plates rigidly affixed within each said rail box, that reside normal to a linear axis of said rail box and have an orifice formed therethrough and
 a pair of shock absorber guides extending normally from said spacer plates;
 at least two linear, threaded drive rods each housed in one of said rail boxes and affixed at a first end to one of said drive motors and rotationally supported in said orifices formed in said spacer plates;
 a series of floating nuts each nut threadingly engaged onto one of said drive rods and affixed to a shock absorber cylinder mount;
 a series of said shock absorber cylinder mounts each mount affixed to a shock absorber cylinder and having an upper axle thereon with a pair of ends matingly engaged for sliding movement in one of said shock absorber guides;
 a series of paired identical gusset plates each pair extending from an upper end of one said strut;
 a series of shock absorber rod mounts, each rod mount affixed to a shock absorber rod and having a lower axle thereon that is affixed between said paired, parallel gusset plates;
 a series of shock absorbers each having a first end with a rod and a second end with a cylinder that retractably and slidingly houses said rod, wherein each of said shock absorbers is connected between one of said shock absorber guides on said rail boxes and one of said gusset plates on said struts;
 wherein said drive motors rotate to advance said floating nuts to push or pull on said shock absorbers to move said struts between said first acute angle and said second acute angle.

5. A hydroplaning vessel comprising:
 a non floatable outer hull with an open transom;
 a floatable inner hull;
 a suspension and inner hull lift system;

wherein said inner hull is partially cradled within and movably affixed to said outer hull by said suspension and inner hull lift system;
wherein said outer hull has a bottom surface with at least one open, fixed louver formed there through;
wherein said at least one fixed louver is angled with respect to said bottom surface such that said fixed louver has a leading edge nearest a bow of said vessel that is vertically raised with respect to a trailing edge of said fixed louver that is nearest a stern of said vessel;
wherein said suspension and inner hull lift system is vertically extendable so as to be able to raise said inner hull a vertical distance above said outer hull; and
a propulsion system;
a power source for said jet drive; and
a pivotable transmission connected at an upper end to said power source and connected at a lower end to said propulsion system;
wherein said transmission can pivot at its connection to said power source and can pivot at its connection to said jet drive independently; and
further comprising:
an upper gearbox containing a first set of four grouped, 45 degree cut, beveled ring gears that are held in an enmeshed, square configuration;
a substantially similar lower gearbox containing a second set of four grouped, 45 degree cut, beveled ring gears that are held in an enmeshed, square configuration; and
a splined, telescoping driveshaft connected at a first end to said upper gearbox and connected at a second end to said lower gearbox.

6. The hydroplaning vessel of claim 5 further comprising:
said upper gearbox with an upper gearbox housing;
a first right beveled ring gear;
a first left beveled ring gear;
a first front beveled ring gear;
a first rear beveled ring gear; and
a first common axle extending through the center of said first right beveled ring gear and said first left beveled ring gear that is supported in said upper gearbox housing so as to rotationally constrain said first right beveled ring gear and said first left beveled ring gear in said upper gearbox housing;
said lower gearbox with a lower gearbox housing;
a second right beveled ring gear;
a second left beveled ring gear;
a second front beveled ring gear;
a second rear beveled ring gear; and
a second common axle extending through the center of said second right beveled ring gear and said second left beveled ring gear that is supported in said lower gearbox housing so as to rotationally constrain said second right beveled ring gear and said second left beveled ring gear in said lower gearbox housing;
wherein said driveshaft extends normally from the second front beveled ring gear and from the first rear beveled ring gear so as to operationally connect the two gearboxes.

7. The hydroplaning vessel of claim 6 further comprising:
an input shaft affixed to said first front beveled ring gear and connected to said power source;
an output shaft affixed to the second rear beveled ring gear and connected to said jet drive.

8. The hydroplaning vessel of claim 7 further comprising:
a steering and braking system utilizing a series of four adjustable elevons pivotally affixed to said outer hull; and
an elevon manipulation system to tilt the angle of said elevons in response to a mechanical signal from an operator.

9. The hydroplaning vessel of claim 8 wherein each of said said elevon's tilt angle is manipulated to correspond to the tilt angle of either one other elevon or all three other elevons, but never only two of said other elevons.

10. A hydroplaning vessel comprising:
a non floatable outer hull with an open transom;
a floatable inner hull;
a suspension and inner hull lift system;
wherein said inner hull is partially cradled within and movably affixed to said outer hull by said suspension and inner hull lift system;
wherein said outer hull has a bottom surface with at least one open, fixed louver formed there through;
wherein said at least one fixed louver is angled with respect to said bottom surface such that said fixed louver has a leading edge nearest a bow of said vessel that is vertically raised with respect to a trailing edge of said fixed louver that is nearest a stern of said vessel;
a steering and braking system utilizing a series of four adjustable elevons pivotally affixed to said outer hull; and
an elevon manipulation system to tilt the angle of said elevons in response to a mechanical signal from an operator; and
wherein each of said said elevon's tilt angle is manipulated to correspond to the tilt angle of either one other elevon or all three other elevons, but never only two of said other elevons.

* * * * *